United States Patent [19]
Dooley

[11] 3,893,440
[45] July 8, 1975

[54] AUTOMATIC DECOMPRESSION VALVE TO FACILITATE STARTING OF AN INTERNAL COMBUSTION ENGINE

[75] Inventor: James Linville Dooley, Santa Monica, Calif.

[73] Assignee: McCulloch Corporation, Los Angeles, Calif.

[22] Filed: Oct. 26, 1972

[21] Appl. No.: 301,114

[52] U.S. Cl. ............... 123/182; 137/494; 417/299
[51] Int. Cl. ............................................. F01l 13/08
[58] Field of Search ..... 123/182; 417/299; 137/494, 137/528

[56] References Cited
UNITED STATES PATENTS

| | | | |
|---|---|---|---|
| 3,335,711 | 8/1967 | Roorda | 123/182 |
| 3,399,659 | 9/1968 | Isoda | 123/182 |
| 3,626,975 | 12/1971 | Bobst et al. | 137/494 |
| 3,704,588 | 12/1972 | Trabbic | 417/299 |
| 3,782,354 | 1/1974 | Tuckey | 123/182 |

FOREIGN PATENTS OR APPLICATIONS

| | | | |
|---|---|---|---|
| 801,282 | 7/1949 | Germany | 417/299 |
| 1,186,504 | 8/1959 | France | 417/299 |
| 1,221,253 | 2/1971 | United Kingdom | 123/182 |

*Primary Examiner*—Charles J. Myhre
*Assistant Examiner*—W. Rutledge, Jr.
*Attorney, Agent, or Firm*—Burns, Doane, Swecker & Mathis

[57] ABSTRACT

An automatic decompression valve to facilitate starting of an internal combustion engine is provided having a housing including a gas inlet for receiving compression gas from the cylinder of an internal combustion engine and a gas outlet for venting compression from the cylinder of the internal combustion engine to effect lower compression pressures therein. A valve piston is movable in the housing between a closed position to block communication between the gas inlet and the gas outlet and an open position whereby communication is provided between the gas inlet and the gas outlet. The valve piston has a valve opening reaction surface and a valve closing reaction surface cooperable with pressurized gas to open and close the valve. There is also included a piston position control chamber and a gas flow restrictor which provides restricted fluid communication between the piston position control chamber and pressurized gas entering the gas inlet. Gas pressure in the piston control chamber produces a force on the piston which tends to move the piston to the valve closing position. The gas flow restrictor is also operable to resist the flow of gas out of the piston position control chamber to maintain the piston in the valve open position during initial cranking of the engine and closed during operation of the engine after initial cranking and engine starting. An adjustable stop may be provided to adjust the limits of travel between the valve open and valve closed positions.

27 Claims, 9 Drawing Figures

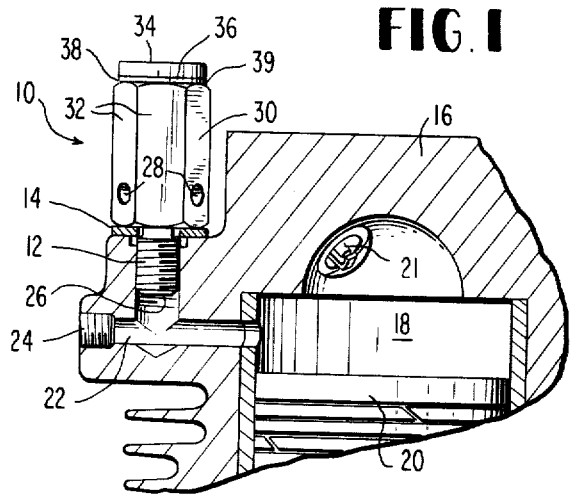
FIG. 1
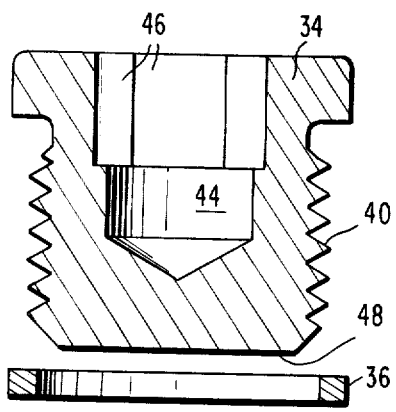
FIG. 2
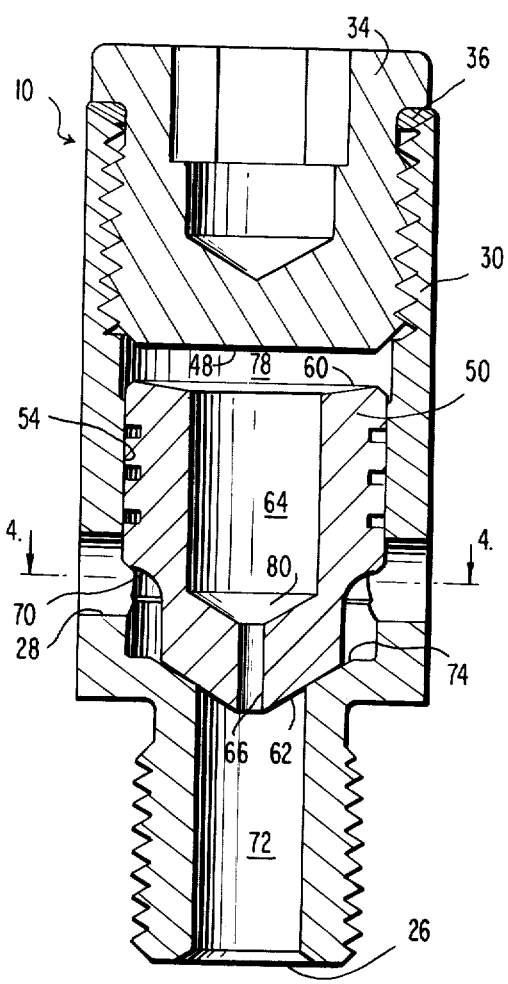
FIG. 3
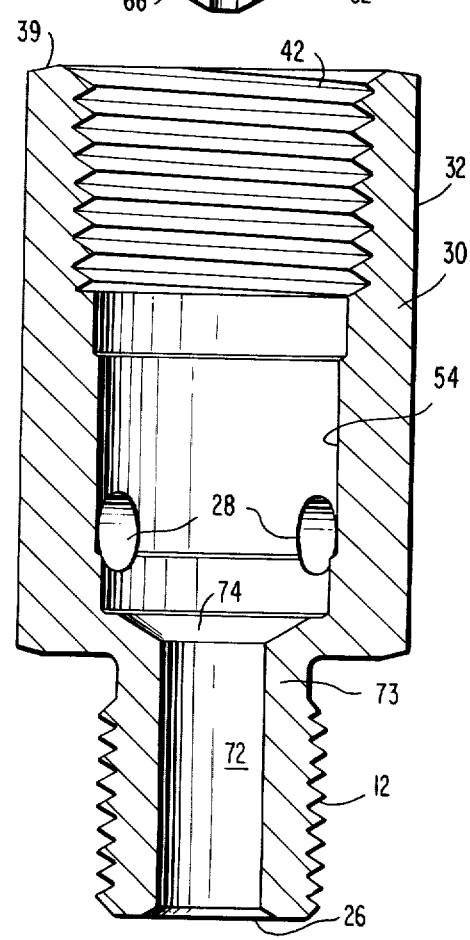

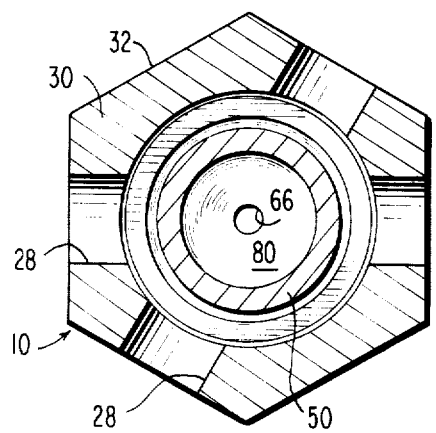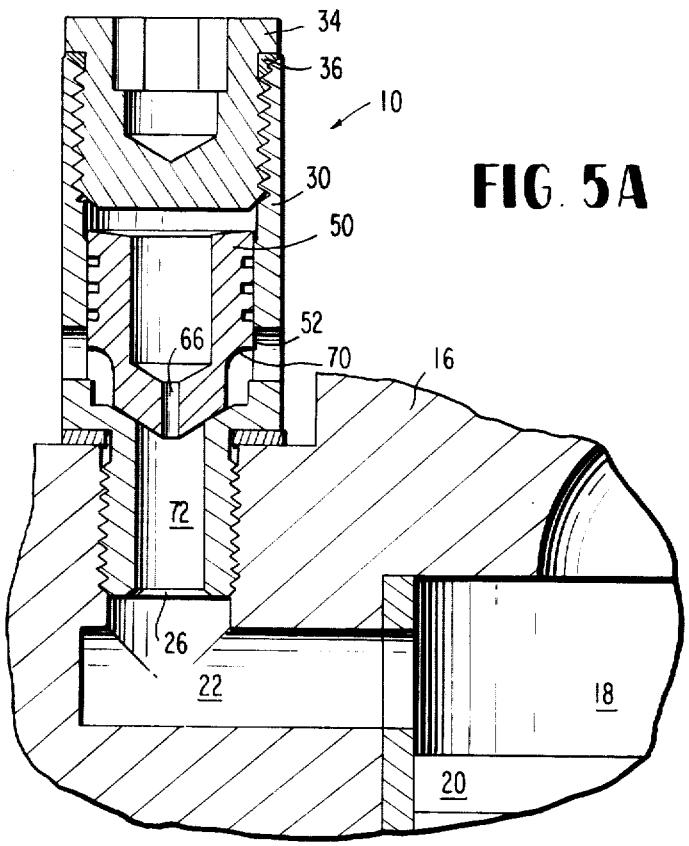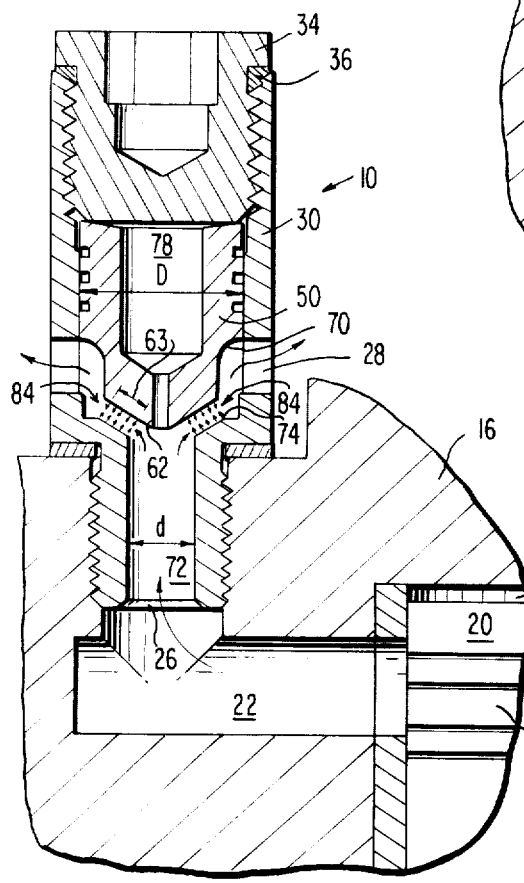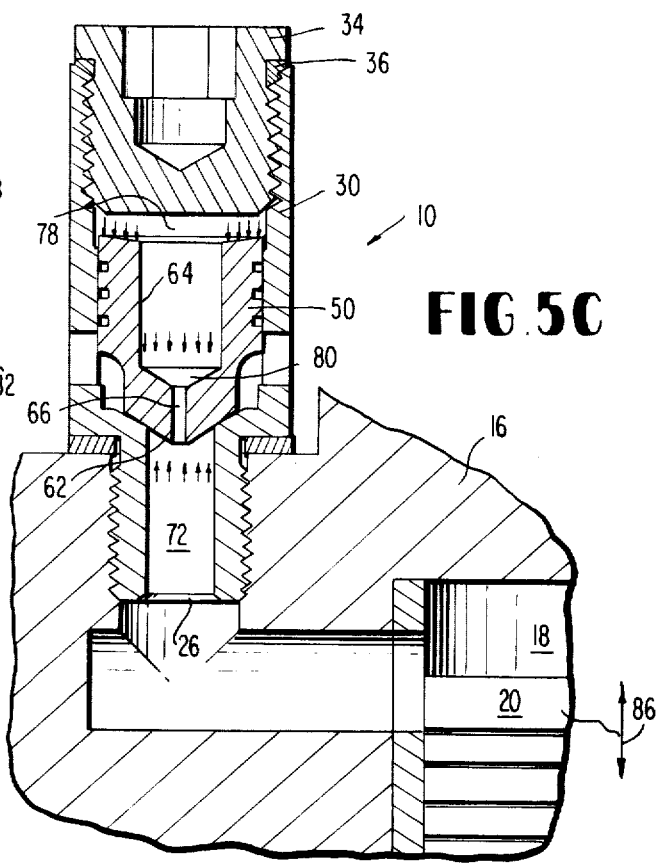

AUTOMATIC DECOMPRESSION VALVE TO FACILITATE STARTING OF AN INTERNAL COMBUSTION ENGINE

BACKGROUND OF THE INVENTION

The present invention relates to a novel starting apparatus for an internal combustion engine, and more particularly to an apparatus for facilitating the starting of an internal combustion engine by the automatic partial relief of compression in the engine while it is being cranked, without a sacrifice of full compression when the engine is operating.

Much of the work needed to crank an engine during starting is often expended in compressing the charge of gas in the combustion chamber during the compression stroke of the piston. This work required for cranking can be reduced almost in direct proportion to the amount by which compression can be relieved. Hence, if there can be achieved a very substantial relief of compression pressure during the cranking revolutions of the engine as is attained with the present invention, an inexpensive rope starter can become a satisfactory starting mechanism, or, if the utmost ease and convenience is desired, the use of a small and inexpensive electric self-starter becomes feasible.

Of course, any apparatus utilized for compression relief should also enable substantially normal compression pressures to be maintained while the engine is operating, and it is extremely desirable that such an apparatus be automatic in accomodating itself to the different conditions occurring during cranking and during operation.

Generally, compression relief can be effected by providing for the more or less controlled escape of gas from the combustion chamber as the piston is moving through the first portion of its compression stroke during starting. In the past, it has been common to start internal combustion engines and particularly small two-stroke engines by first actuating a decompression valve lever by hand to place the engine in a condition relatively free from the loading due to compression. The engine would then be cranked in this condition manually or by an electric self-starting mechanism. When the engine attained an appropriate operating condition, the decompression valve lever would be returned to its inoperative position. However, if an operator of an engine having such a decompression valve fails to remember to actuate the valve prior to cranking, decompression is not effected. This may result in resistance to a rope type starter sufficient to produce jerking of a hand-held engine, such as that of a chain saw, away from the grip of the operator with possible injury to the operator or damage to the engine resulting. Moreover, electric self-starting mechanisms may be severely damaged where resistance from normal engine compression occurs.

Attempts have been made to construct an automatic decompression valve which would eliminate the requirement of manual actuation to effect easy starting of an internal combustion engine. For example, see U.S. Pat. No. 3,399,659 to Haruo Isoda, for an "Automatic Non-Compression Starting Device" which utilizes a spring biased valve which is mechanically overcome by an increase in oil pressure.

However, spring biased valves may often experience "sticking." This is especially the case in connection with engines utilizing an arrangement where lubrication is mixed with the fuel. In such cases the exhaust gases contain large quantities of hydrocarbons which may form deposits within the valve and hence may be the primary cause of this sticking. Moreover, spring biased decompression valves may be subject to a tendency to "chatter," that is to say, the pulsating pressure in the engine may partially unseat the valve with each cycle of the working piston, thus causing an oscillation or vibration in the valve which may diminish the valve's effectiveness and eventually damage its sealing capability.

OBJECTS AND SUMMARY OF A PREFERRED FORM OF THE INVENTION

Accordingly, it is a general object of the present invention to provide a novel automatic decompression starting valve which minimizes or reduces at least some of the problems previously existing in the prior art.

It is a more particular object of the present invention to facilitate the starting of an internal combustion engine, and to provide a novel automatic decompression starting valve for an internal combustion engine for initially maintaining the engine in a decompressive state during cranking and for automatically terminating the decompressive state when the engine has reached predetermined operating conditions, i.e., proper cylinder firing.

It is likewise an object of the present invention to provide a novel automatic decompression starting valve which is not subject to chatter by reason of being spring biased into an actuation mode.

It is also an object of the present invention to provide a novel automatic decompression starting valve for starting an internal combustion engine, which valve is adjustable so as to accommodate internal combustion engines of various operating characteristics.

A preferred embodiment of the invention intended to accomplish at least some of the foregoing objects includes a valve comprising a housing or body in which a valving member or piston is received. A cap and a shim-seal are employed to close the housing. The housing has an inlet port means communicating with a working cylinder of the engine, an outlet port means, and screw threads for receiving the cap. The piston is slidable inside the housing to selectively block communication between the inlet port means and the outlet port means. The piston is hollow to define a piston position control chamber communicating with the inlet port means through an orifice passing through a crown portion of the piston. A portion of the cap limits the travel of the piston in one direction, the extent of this limiting action being controllable by the selection of a desired thickness of the shim-seal between the cap and housing.

With the engine off, the valve piston has no preferential location; however, the "rock-back" from the previous engine shut down may create a condition which will generally cause the piston to move to a limit of travel to open the valve. In any event, if the valve happens to be in the closed position prior to cranking, the normal pulling of a rope starter or the engaging of an electric self-starting mechanism will cause the engine to move through the first compression cycle which will, with little resistance, open the valve to provide easy cranking. This is caused by the force of the valve piston produced by the pressure of gas entering the inlet port means acting on valve opening reaction surface means comprised by an external exposed portion of the seated piston crown. Pressure in the control chamber does not initially approach the pressure of the entering gas since the orifice in the piston crown offers restriction or impedance to gas flow into that chamber.

When the engine is cranked, compressed gas from the working cylinder continues to enter the valve housing through the inlet port. Some of this gas passes through the crown orifice and converts to a static pressure head in the control chamber which acts on a valve closing reaction surface comprised by an inside portion of the crown portion of the piston. This pressure head, which builds up accumulatively with each stroke of the working piston of the engine, acts initially on the area behind the crown portion and later on an upper shoulder of the piston. Gas which does not flow into the control chamber behind the piston escapes out of one or more outlet ports or vent holes in the valve housing.

As compression gas vents through the valve, it passes through a restricted zone defined by a bevelled valve seat and an outer portion of the face of the piston crown. A venturi effect or pressure drop results and produces a net force tending to move the piston face towards the bevelled valve seat.

The primary reaction surfaces on the piston against which the pressurized gas acts do not have the same areas. That is, the pressure head created by gas entering the inlet port acts on a portion of the outer face of the piston crown of smaller area than that of the back side of the crown on which the static pressure in the control chamber initially acts. At the same time, the area of the remaining portion of the outer piston face is acted on by the reduced pressure caused by gas travel through the aforementioned restricted zone. After a few engine strokes, a net force, which is gradually built up when the engine "fires" as the pressure during expansion is increased and which tends to move the piston face against the valve seat, is produced so as to block communication between the input port and the output ports.

Once the piston has moved to a position to close the valve, the force of the pressurized gas action on the reaction surfaces of different areas of the piston will produce an increased net force tending to hold the valve closed, i.e., the piston face will be forced tightly against the valve seat.

The tendency of the valve piston to remain seated during engine operation is enhanced by the fact that the now increased static pressure in the control chamber is impeded against substantial reduction because of the restriction provided by the orifice in the crown portion, and additionally by the fact that the pressure on the external face of the seated piston fluctuates during the cycle of the engine. This fluctuation, during lower pressure stages, reduces forces tending to open the valve piston. During high pressure stages its tends to increase the static pressure in the control chamber without producing sufficient force to open the valve. Thus, it will be appreciated that pressure fluctuating rather than causing "chatter" of the valve during engine operation, aids in maintaining the valve closed.

However, in a non-operating condition of the engine, the pressure in the control chamber tends to "bleed down" and equalize with that in the working cylinder, so that increased working cylinder pressure produced by the next compression stroke of the working piston will readily force open the valve piston if it is perchance in a closed position at the time engine cranking is commenced.

To adapt the valve for engines having different operating characteristics, such as a higher (or lower) compression ratio or different piston displacements, the valve housing cap may be adjusted by adjusting the shim thickness to alter the permitted travel of the valve piston so as to enable a higher or lower engine cylinder pressure to move the valve piston into a closed position. This procedure may also be utilized to adjust the piston travel for a given engine if the valve closes too soon during cranking. That is to say, if the force produced by pressure in the chamber behind the valve piston exceeds the force acting on the face of the valve too soon with respect to engine cranking, the piston may be moved further away from the source of pressurized gas, and the venturi effect can be reduced in order to delay valve closing. Likewise, in instances when the valve does not close after the engine has been started, the piston stop may be moved forward by reducing the shim thickness.

As will become more apparent below, the operation of a valve according to the present invention is essentially independent of spacial orientation of the valve with respect to the engine cylinder.

Other objects and advantages of the present invention will become apparent with reference to the following detailed description of a preferred embodiment thereof, in connection with the accompanying drawings, in which:

THE DRAWINGS

FIG. 1 is a fragmentary partial sectional view of a working cylinder of an internal combustion engine showing an automatic decompression starting valve according to the present invention;

FIG. 2 is a cross-sectional exploded view of the automatic decompression starting valve of FIG. 1;

FIG. 3 is a cross-sectional view of the assembled automatic decompression starting valve of FIG. 2;

FIG. 4 is a cross-sectional view of the automatic decompression starting valve taken along the plane of line 4—4 of FIG. 3;

Figure 6:
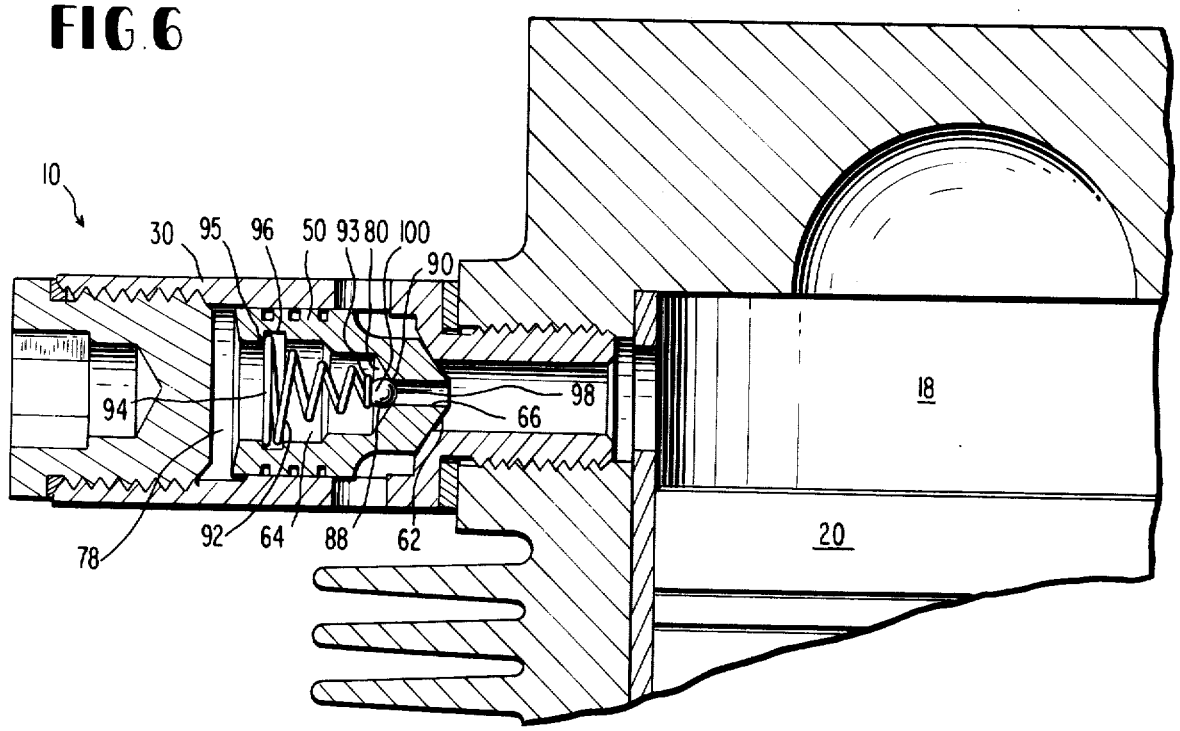
Figure 7:
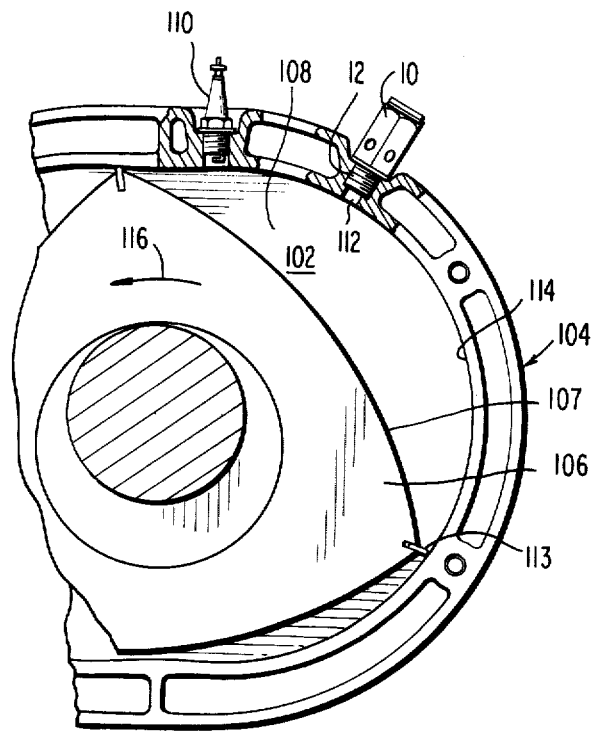

FIG. 5A schematically shows the automatic decompression starting valve of FIG. 3 placed in communication with the working cylinder of an internal combustion engine which is not operating and wherein the piston of the valve is situated so as to place the valve in a closed position;

FIG. 5B shows the valve of FIG. 5A with the piston of the valve in a position during initial moments of engine cranking;

FIG. 5C shows the automatic decompression starting valve of FIG. 5A with the piston of the valve in a position for normal engine operation;

FIG. 6 schematically shows, in a manner similar to FIG. 5A, an alternative embodiment of the automatic decompression starting valve of the present invention placed in communication with the working cylinder of an internal combustion engine which is not operating and wherein the piston of the valve is situated so as to place the valve in a closed position; and FIG. 7 is a fragmentary partial sectional view of a rotary cylinder of an internal combustion engine showing an automatic decompression starting valve according to the present invention.

DETAILED DESCRIPTION

Referring now to the drawings wherein like reference characters have been applied to like parts throughout, there is shown in FIG. 1 an automatic decompression starting valve 10 (which hereinafter may be referred to simply as "valve") affixed by a threaded portion 12, to an upper cylinder portion of an internal combustion engine 16. A sealing washer 14 may be employed in this connection.

The engine 16 has a working cylinder 18, a piston 20 and a spark plug 21. Since the working parts of an internal combustion engine do not, in and of themselves, comprise a portion of the present invention, the details of such an engine need not be presented herein. However, it will be appreciated from the foregoing background of this invention that the valve 10 may be operable in combination with conventional reciprocating or rotary piston engines.

A passage 22 places the valve 10 in communication with the cylinder 18. A maintenance plug 24 may be provided for access to passage 22 for purposes of cleaning away any deposits which may accumulate. It will be appreciated, of course, the passage 22 may have a variety of shapes, lengths, and orientations and may be cleaned in the absence of such maintenance plug 24 by simply unscrewing and removing the valve 10.

A gas inlet port 26 is provided at the mouth of the threaded portion 12 at one end of the housing portion 30 of the valve 10. Outlet ports 28 (only two of which may be seen in FIG. 1) are provided in a cylindrical housing portion 30 of the valve 10. The housing 30 has six faces 32 (only three of which may be seen in FIG. 1) which may be arranged in a hexagonal fashion to permit insertion or removal of the valve 10 by means of a conventional wrench or similar tool. A cap 34 is screw-threaded into the other end portion of the body 30. The cap 34 may have a hexagonal bore (not shown in FIG. 1) for receiving an "allen-type" wrench to expedite insertion or removal of the cap 34 in an internally threaded portion (not shown in FIG. 1) of the housing 30.

A shim-seal 36 is seated between a shoulder 38 of the cap 34 and a top rim 39 of housing 30. This shim-seal 36 limits the distance which the cap 34 may be inserted into the housing 30. As will be apparent, a reduced thickness of shim-seal 36 permits an increased penetration of the cap 34 into the housing 30.

Referring now to FIG. 2, there is shown the cap 34 having a series of threads 40 corresponding to a series of interior threads 42 of the housing 30. As noted above, the cap 34 has an axial bore 44 and a plurality of faces 46 hexagonally arranged to receive a conventional "allen-type" wrench or other similar tool for purposes of inserting or removing the cap 34 from a screw threaded engagement with the housing 30. The cap 34 has a lower face 48 against which a valve piston 50 rests when the valve 10 is in its fully open position.

The piston 50 has an outer wall 52 which slidably engages an interior cylinder wall 54 of the housing 30. Circumferentially disposed about the piston 50 are a plurality of channels 56. A partial seal is provided between the contact surfaces of the housing 30 and the piston 50. An upper shoulder 60 defines the upper extreme of the piston 50, and a conical face 62 defines a lower extreme of the piston 50.

The piston has a crown portion 68. The crown portion 68 has a bore defining an orifice 66 which places a hollow portion 64 of the piston 50 in fluid communication with a portion of the interior of housing 30. This hollow portion 64 of the piston 50 defines a pressure cavity or piston position control chamber which will hereinafter be more fully explained. The crown portion 68 is contiguous with a rediused shoulder portion 70 which extends to the outer wall 52 of the piston 50.

The housing 30 has an axial bore defining an inlet passage 72 through the screw threaded portion 12. The inlet passage 72 places the gas inlet portion 26 in communication with a portion of the interior of the housing 30. Adjacent an upper end 73 of the inlet passage 72, there is a beveled edge defining a valve seat 74.

Turning to FIG. 3, it can be seen that the piston 50 is constrained to travel along the interior cylinder wall 54 of the housing 30 between a position where conical face 62 rests on the valve seat 74 and a position where the piston shoulder 60 rests against the face 48 of the cap 34. It can be seen that if the thickness of shim-seal 36 were increased, then the the cap 34 would not be permitted to penetrate the body 30 as far as shown. As a result, the face 48 would then be disposed closer to the top rim 39 of the housing 30 hence permitting the piston 50 to travel a greater distance upwards.

A control chamber 78 is defined by changing (depending upon piston position) volume beneath the face 48 of the cap 34 and the volume of the cavity 64 of the piston 50. It will be apparent that as the piston 50 moves upwards toward the cap 34, the volume of the control chamber 78 will decrease. This control chamber 78 is placed in fluid communication with the gas inlet passage 72 by means of the orifice 66 in the piston 50.

When the piston 50 is in a position as shown in FIG. 3, gas passing into the gas inlet port 26 and into the passage 72 of the housing 30 is prevented from escaping through gas outlet ports 28 because the face 62 of the piston 50 is seated against the valve seat 74 which blocks the fluid passage.

Turning now to FIG. 4, there can be seen the valve 10 in cross-section and looking down along the plane of line 4—4 of FIG. 3. The orifice 66 of the piston 50 is shown. An inside conical reaction face 80 may also be seen. It is on this face 80 that the pressure in the control chamber 78 initially acts.

Whereas, in a preferred embodiment of the present invention, four gas outlet ports 28 are utilized, as shown in FIG. 4, this invention is not intended to be limited to any particular number. On the contrary, either a greater or lesser number of gas outlet ports or vents may be utilized in the practice of this invention. A determination of the number of such ports may be made in accordance with the physical characteristics of the engine with which this valve may be utilized and the sizing of the valve parts.

Turning now to FIGS. 5A, 5B, and 5C, there can be seen schematically the valve 10 with the piston 50 in several positions. In the FIG. 5A, there is shown the cylinder 18 having the working piston 20 therein. The passage 22 places the cylinder 18 in communication with the gas inlet port 26 at the mouth of the gas inlet passage 72. In FIG. 5A, it will be assumed that the engine is not operating, and, hence, the piston 50 of the valve 10, being free to assume any position between the extremes of its travel, has by chance come to rest in a position to close the valve 10.

In FIG. 5B, there can be seen that the piston 20 has been made to move upwards as indicated at 82 as a result of a rope starter (not shown) having been pulled or as a result of an electric starting mechanism (also not shown) having been engaged. The upward movement of the working piston 20 tends to compress the gas in the cylinder 18. Since prior to such initial compression, the pressure in the working cylinder 18 and the control chamber 78 has been essentially equalized, the increased pressure head created by the initial compression stroke of the working piston 20 is sufficient to displace the piston 50 to a position to open the valve and permit continued easy cranking. It will be appreciated that this initial increased pressure acts initially upon the exposed reaction surface adjacent the inlet passage 72, and shortly thereafter on the entire external piston face; but it is prevented from acting on the internal piston reaction face 80 by reason of the orifice 66 providing impedance to flow into the control chamber.

As indicated by the arrows, during engine operation compressed gas from the cylinder 18 passes into the passage 22, into the gas inlet port 26, along the gas inlet passage 72, and to the atmosphere through the outlet ports 28. As the compression gas escapes through the valve 10 it moves between an outside portion 63 of the conical face 62 and the beveled edge 74. since the area of the cross-section of the inlet passage 72 and the area of the cross-section of each of the outlet ports 28 both exceed the area of the cross-section of the zone between the outside portion 63 of the piston face and the valve seat 74, a venturi effect occurs to produce relatively low pressure in zones 84 (schematically depicted in FIG. 5B by a series of small arrows) between a portion 63 of the outside reaction face of the piston and the valve seat 74 adjacent each of the outlet parts 28. This venturi effect becomes much more pronounced as the engine starts and speeds up At the same time, the static pressure in the control chamber 78 is increased during engine operation by gas entering through the orifice 66.

It will be noted that the piston 50 is pushed by the compressed gas from the cylinder 18 to its uppermost limit of travel. In this position, it is preferred that shoulder 70 aligns with the gas outlet ports 28 to provide a relatively smooth flow path for the venting or outlet gas. When the valve 10 is in its closed position (see, e.g., FIG. 5A) the piston outside wall 52 may partially close the outlet ports 28. As illustrated the closure is approximately half way. However, these relative positions may be varied.

Turning now to FIG. 5C, it will be seen that the engine has been cranked, and the piston 20 is reciprocating in a usual manner as as schematically indicated by a double headed arrow 86. The pressure in the chamber 78 has, at this point, reached a value sufficient to produce a closing force. It will be appreciated that the "closing" of the valve is effected in the illustrated embodiment by the seating of the face 63 of the piston 50 against the valve seat 74.

As a result of the pulsating compression in the cylinder 18, a pulsating pressure head is seen at the face 62 of the piston 50 some stages of which are lower than the pressure in the chamber 78. Moreover, since the orifice 66 resists flow of gas out of the chamber 78, the valve tends to remain closed, particularly since the pressure in the chamber 78 acts not only on the internal reaction surface 80 (which is of an area somewhat greater than the exposed or unseated portion of the external piston face) but also on the top annular surface 60 of the piston 50.

However, as will be seen in FIG. 5B, at least for an initial period of time during cranking and despite the creation of the relatively low pressure zone 84, there will be a net force upwardly on the piston 50 since the orifice 66 also resists flow into the control chamber 78; ultimately, however, the central chamber pressure increases and, since the piston 50 is "free-floating," the combined effects of the reduced pressure in the zone 84 and the pressure acting across the differential areas D and d noted (in FIG. 5B on the piston 50 produce a net downward force which moves the piston 50 to the closed position, shown in FIG. 5C. This downward movement further reduces the distance between the face 63 of the piston 50 and the valve seat 74 to augment the venturi affect to yet further reduce the pressure in the low pressure zone 84. The net effect is that the piston 50 will continue to move downwardly until it seats firmly on the valve seat 74.

As noted earlier, since the piston 50 is "free-floating," the "rock-back" from the previous engine shut down may cause the valve to open. This desirable result may occur because when the engine is shut down, there is a reduction in the pressure of the gas in the gas inlet passage 72 as a result of the final exhaust stroke. The relatively slow speed of travel of the engine may permit the pressure of the gas in the control chamber 78 to drop to a value close to that in the gas inlet passage 72 as the piston 20 completes the exhaust stroke. However, the momentum of the piston 20 in the working cylinder 18 may cause the piston 20 to travel partially through another compression stroke or to "rock-back." The pressure head produced at the unseated portion of face 62 of the piston 50 may sufficiently exceed the now reduced pressure in the control chamber 78 to displace the piston 50 to the open position in a manner similar to that described for the initial displacement of the piston 50 when the valve 10 is closed prior to cranking.

In FIG. 6 there can be seen an alternative embodiment of the piston 50 of the present invention. A ball 88 is seated over an interior terminus 90 of the orifice 66. A spring 92 is positioned in the cavity 64 of the piston 50 with one end 93 of the spring 92 resting on the ball 88 and the other end 94 of the spring 92 retained by a ledge 95 of an interior channel 96 of the piston 50.

It may be noted, that the orifice 66 is slightly larger in cross-sectional area in this alternative embodiment than that in the embodiment without the ball 88 as shown in, say, FIG. 5A. The combined impedance to gas flow offered by the slightly larger orifice 66 together with the spring-biased ball 88 may, however, approximate the impedance to inward flow offered by the smaller orifice 66 of the embodiment without the ball 88. It will be apparent that the ball 88 provides a somewhat greater impedance to gas flow out of the chamber 78 than the embodiment discussed above. However, the ball 88 need not be a positive seal to gas flow out of the chamber.

It is also noted that the spring 92 operates only to bias the ball 88 against the orifice 66 and does not bias the piston 50 into any preferred position. The piston 50 is essentially free floating in that it is free to come to rest at any position within the constraints of its travel. Thus the spring does not introduce chattering problems into valve operation.

Overall operation of the embodiment of invention depicted in FIG. 6 is substantially similar to that of the previously described embodiment. However, as can be seen from FIG. 6, the ball 88 functions as a primary impedance to the flow of gas from the pressure chamber 78 outwardly through the orifice 66. In addition the pressure head created by the compression gas from the cylinder 18 acts not only against the unseated portion of the face 62 as in the other embodiment, but also acts against a bottom surface 98 of the ball 88 covering the orifice 66. So it can be seen, that if the piston 50 of this alternative embodiment is initially disposed so as to close the valve 10, it may be displaced in essentially the same manner as the piston 50 without the ball 88.

The strength of the spring 92 is such that when the piston is in an upper position, i.e., when the valve in open, the compressed gases from the cylinder 18 may displace the ball 88 slightly so that compressed gas may enter the pressure chamber 78. With each compression stroke of the piston 20, the pressure in the control chamber 78 may be thus increased.

With each exhaust stroke of the piston 20 the pressure against the face 62 will be reduced relative to the pressure in the pressure chamber 78. When this occurs, the spring 92 will bias the ball 88 against the terminus 90 of the orifice 60 to prevent the escape of gas from the pressure chamber 78. The pressurized gas in the pressure chamber 78 acts not only on the reaction surface 80, but also on a top portion 100 of the ball 88 to effect a downward force on the piston 50.

In FIG. 7 there can be seen the automatic decompression valve 10 affixed by the threaded portion 12 so as to communicate with a compression zone 102 of a conventional rotary piston internal combustion engine 104. The rotary piston engine 104 has a generally triangular rotary piston 106 with convex sides 107, a cylinder 108, a spark plug 110. A passage 112 places the valve 10 in communication with the compression zone 102 defined in the cylinder 108. The rotary valve engine operates in a known fashion, and its details will therefore not be discussed here.

The operation of the valve 10 in the compression zone 102 of rotary piston engine 104 is substantially similar to that in the reciprocating piston engine 16 described above and need not be discussed in further detail.

It should be noted that, as in the case of the previously discussed embodiment, the diameters of the inlet passage 72 and the outlet ports 28, and the resistance to flow occasioned by the venturi effect referred to above, are related so that there is a venting of a sufficient quantity of compressed gas to effect decompression for easy starting yet there is also maintained a sufficient compression in the cylinder 18 to enable the engine to begin operating. These dimensions may also be related to the dimensions of the inlet and exhaust ports of the working cylinder 18. The relative sizes will, of course, depend upon the characteristics of the type and size of engine and represent design considerations that may be accounted for by those skilled in this art.

Thus, it can be seen that with the valve 10 of the present invention, compression from the cylinder 18 is allowed to escape at a predetermined rate, thereby facilitating easy cranking of the engine. After a few moments of operation, the gas acting on the face 62 of the piston 50 and the gas in the pressure chamber 78 assume approximately equal pressures; and as a result of the venturi effect discussed above as well as the differential areas of the inlet passage 72 (having a diameter d) and the chamber 78 (having a diameter D), there is created a force differential which tends to push the piston 50 towards the valve seat 74.

Since the pressure in the chamber 78 approximates that against the unseated portion of the face 62 of the piston 50, the force against the reaction surface 80 and the annular upper piston rim 60 (along with the surface 100 of the ball 88 in the case of the alternative embodiment shown in FIG. 6) will exceed the force on the face 62 of the piston 50 during engine operation so that the valve will remain closed.

As in the case of the previously described embodiment, if the piston 50 is situated too high in the housing 30 for proper operation, the thickness of the shim-seal 36 may be reduced to permit the cap 34 to penetrate further or less into the body 30 to thereby narrow or increase the gap between the outside face 63 of the piston 50 and the valve seat 74. In the case of narrowing this gap, a lower relative pressure is created in the low pressure zone 84 to thereby make available greater flow to be diverted into the mouth of the orifice 66. With this increased flow into the mouth of the orifice 66, there occurs a corresponding increase in pressure in the pressure chamber 78. As such the closing time of the valve will be altered.

With the closing of the valve 10 in either of the illustrated embodiments, the compression in the cylinder 18 may rise to its full value, and the engine may proceed to function normally.

SUMMARY OF ADVANTAGES

It will be appreciated that in constructing an automatic decompression valve for easy starting of an internal combustion engine according to the present invention, certain significant advantages are provided.

In particular, the operation of a valve according to this invention provides completely automatic decompression for easy starting and, hence, minimizes the work needed to crank an internal combustion engine.

Also important is the capability of utilizing an electric self-starting mechanism for an internal combustion engine without encountering damage to such devices as a result of a failure to provide decompression for a working cylinder.

Also advantageous is the ability to easily crank and start hand held power tools such as chain saws which utilize internal combustion engines with a reduced danger of an operator pulling such a device out of his grasp as a result of pulling smartly on a rope type starter and encountering full compression forces because he forgot to actuate a manual decompression valve.

Of further importance is the elimination of a spring to bias a decompression valve towards a particular mode. By eliminating such a spring, improved cranking and starting are likely to be experienced over longer periods of time without malfunction from deposits. In this connection "chatter" problems are also minimized and valve stability is in fact enhanced.

Thus it is apparent that there has been provided, in accordance with the invention, an automatic decompression valve for easy starting of an internal combustion engine that substantially satisfies the objects and

What is claimed is:

1. An automatic decompression valve to facilitate starting of an internal combustion engine, said valve comprising:

housing means defining valve cylinder means and including:

gas inlet means for receiving compression gas from the cylinder of an internal combustion engine, and gas outlet means for venting compression gas from the cylinder of the internal combustion engine to effect decompression thereof;

valve piston means movable in said valve cylinder means between a valve closed position wherein said valve piston means is operable to block communication between said gas inlet means and said gas outlet means, and a valve open position wherein said valve piston means is operable to render said gas inlet means communicable with said gas outlet means;

said valve piston means including a valve opening reaction surface means and valve closing reaction surface means;

said valve opening reaction surface means being responsive to pressurized gas entering said gas inlet means for producing a force on said piston means tending to move said piston means to said valve open position;

piston position control chamber means;

gas flow restriction means, including an orifice, for providing restricted fluid communication between said piston position control chamber means and pressurized gas entering said gas inlet means;

said valve closing reaction surface means being responsive to gas pressure in said piston position control chamber means for producing a force on said piston means tending to move said piston means to said valve closed position;

said gas flow restriction means being operable to resist flow into said piston position control chamber means of gas entering said gas inlet means so as to maintain said valve piston means in said valve open position during initial cranking of the internal combustion engine; and said gas flow restriction means being further operable to resist flow of gas out of said piston position control chamber means so as to maintain said piston means in said valve closed position during operation of the internal combustion engine after initial cranking.

2. An automatic decompression valve according to claim 1 wherein said piston means includes a crown portion defining said first reaction surface means.

3. An automatic decompression valve according to claim 2 wherein said first reaction surface means defined by said crown portion of said piston means includes:

a first section continuously communicable with said gas inlet means; and a second section blocked from communication with said gas inlet means with said piston means in said valve closed position, and otherwise communicable with said gas inlet means.

4. An automatic decompression valve according to claim 3 wherein:

said crown portion of said means is cooperable with a valve seat, with said piston means in said valve closed position to block communication between said gas inlet means and said outlet means, and at least a portion of said second section of said first reaction surface means is cooperable with said valve seat to define a low pressure zone of gas vented from said gas inlet means through said gas outlet means.

5. An automatic decompression valve according to claim 1 wherein said housing means includes adjustable stop means for adjusting the limits of travel of said piston means between said valve open and valve closed positions.

6. An automatic decompression valve according to claim 1 wherein said piston position control chamber and said valve closing reaction surface means are defined by the walls of a hollow portion of said piston means.

7. An automatic decompression valve according to claim 6 wherein said piston means includes a crown portion defining said first reaction surface means.

8. An automatic decompression valve according to claim 7 wherein said first reaction surface means defined by said crown portion of said piston means includes:

a first section continuously communicable with said gas inlet means; and a second section blocked from communication with said gas inlet means with said piston means in said valve closed position, and otherwise communicable with said gas inlet means.

9. An automatic decompression valve according to claim 8 wherein:

said crown portion of said piston means is cooperable with a valve seat, with said piston means in said valve closed position to block communication between said gas inlet means and said outlet means, and at least a portion of said second section of said first reaction surface means is cooperable with said valve seat to define a low pressure zone of gas vented from said gas inlet means through said gas outlet means.

10. An automatic decompression valve according to claim 9 wherein said housing means includes adjustable stop means for adjusting the limits of travel of said piston means between said valve open and valve closed positions.

11. an automatic decompression valve to facilitate starting of an internal combustion engine, said valve comprising:

an elongate housing having a central bore and communicable with a cylinder of an internal combustion engine;

piston means slidably disposed in the bore of said housing for selectively moving between an open and closed position with respect to the bore;

actuation means for automatically displacing said piston means from a position to open the bore during cranking of the internal combustion engine to a position to close the bore after the internal combustion engine has started;

said actuation means comprising:

a first reaction surface means on said piston means operably responsive to a first compression stroke of the internal combustion engine for displacing said piston means to the position to open the bore to provide decompression in the cylinder of the internal combustion engine;

a second reaction surface means on said piston means responsive to gas pressure produced by compression pressure on said first reaction surface means;

means for substantially equalizing the pressure on said first and second reaction surface means; and said second reaction surface means having a greater area than the area of said first reaction surface means to effect a differential force on said piston means when the pressure is substantially equalized on said first and second reaction surface means to aid in displacing said piston means to a position to close the bore to restore compression in the cylinder of the internal combustion engine.

12. The automatic decompression valve of claim 11 wherein an adjusting means is operatively connected to said housing for adjusting a limit of travel of said piston means in said housing to vary the time with respect to the operation of the internal combustion engine, when said valve will restore normal compression to the cylinder of the internal combustion engine.

13. The automatic decompression valve of claim 12 wherein said adjusting means comprises a screw cap threaded into an end of said housing.

14. The automatic decompression valve of claim 13 including a shim-seal which is placed between a portion of said screw cap and said housing to effect a fluid-tight seal between said screw cap and said housing and to prevent said screw cap from penetrating said housing beyond a predetermined distance.

15. An automatic decompression valve to facilitate starting of an internal combustion engine, said valve comprising:

an elongate housing having a central bore and communicable with a cylinder of an internal combustion engine;

piston means slideably disposed in the bore of said housing for selectively moving between an open and closed position with respect to the bore;

actuation means for automatically displacing said piston means from a position to open the bore during cranking of the internal combustion engine to a position to close the bore after the internal combustion engine has started;

said actuation means comprising:

a first reaction surface means on said piston means operably responsive to a first compression stroke of the internal combustion engine for displacing said piston means to the position to open the bore to provide decompression in the cylinder of the internal combustion engine;

a second reaction surface means on said piston means responsive to gas pressure produced by compression pressure on said first reaction surface means;

means for substantially equalizing the pressure on said first and second reaction surface means comprising an orifice in said piston means to place compression gas operating on said first reaction surface means in communication with the gas operating on said second reaction surface means; and said second reaction surface means having a greater area than the area of said first reaction surface means to effect a differential force on said piston means when the pressure is substantially equalized on said first and second reaction surface means to aid in displacing said piston means to a position to close the bore to restore compression in the cylinder of the internal combustion engine.

16. The automatic decompression valve of claim 15 wherein an adjusting means is operatively connected to said housing for adjusting a limit of travel of said piston means in said housing to vary the time with respect to the operation of the internal combustion engine, when said valve will restore normal compression to the cylinder of the internal combustion engine.

17. The automatic decompression valve of claim 16 wherein said adjusting means comprises a screw cap threaded into an end of said housing.

18. The automatic decompression valve of claim 17 including a shim-seal which is placed between a portion of said screw cap and said housing to effect a fluid-tight seal between said screw cap and said housing and to prevent said screw cap from penetrating said housing beyond a predetermined distance.

19. An automatic decompression valve to facilitate starting of an internal combustion engine, said valve comprising:

elongate housing means having a central bore and communicable with a cylinder of an internal combustion engine, said housing means further comprising:

gas inlet means for receiving compression gas from the cylinder;

gas outlet means for venting compression gas from the cylinder to effect decompression in the cylinder;

piston means slideably disposed in the central bore of said housing means and having a crown portion for selectively blocking communication between said gas inlet means and said gas outlet means;

said crown portion having a first reaction surface means having a relatively large area and a second reaction surface means having a relatively small area;

said piston means having an orifice in said crown portion to provide means for substantially equalizing the pressure on said first and said second reaction surface means of said crown portion; and means, including said orifice, for creating a force differential across said crown portion produced by gas pressure acting on said first and second reaction surface means so as to displace said piston means to block communication between said gas inlet means and said gas outlet means and thereby restore compression in the cylinder of the internal combustion engine.

20. The automatic decompression valve of claim 19 wherein an adjusting means is operatively connected to said housing for adjusting a limit of travel of said piston means in said housing to vary the time with respect to the operation of the internal combustion engine, when said valve will restore normal compression to the cylinder of the internal combustion engine.

21. The automatic decompression valve of claim 20 wherein said adjusting means comprises a screw cap threaded into an end of said housing.

22. The automatic decompression valve of claim 21 including a shim-seal which is placed between a portion of said screw cap and said housing to effect a fluid-tight seal between said screw cap and said housing and to prevent said screw cap from penetrating said housing beyond a predetermined distance.

23. An automatic decompression valve to facilitate starting of an internal combustion engine, said valve comprising:
- an elongate housing having a central bore and communicable with a cylinder of an internal combustion engine;
- piston means slideably disposed in the bore of said housing for selectively moving between an open and closed position with respect to the bore;
- actuation means for automatically displacing said piston means from a position to open the bore during cranking of the internal combustion engine to a position to close the bore after the internal combustion engine has started;
- said actuation means comprising:
  - a first reaction surface means on said piston means operably responsive to a first compression stroke of the internal combustion engine for displacing said piston means to the position to open the bore to provide decompression in the cylinder of the internal combustion engine;
  - a second reaction surface means on said piston means responsive to gas pressure produced by compression pressure on said first reaction surface means;
  - means for substantially equalizing the pressure on said first and said second reaction surface means comprising an orifice in said piston means to place compression gas operating on said first reaction surface means in communication with the gas operating on said second reaction surface means and valve means in said orifice for blocking said orifice during an exhaust stroke of the internal combustion engine and opening said orifice during a compression stroke of the internal combustion engine; and
  - said second reaction surface means having a greater area than the area of said first reaction surface means to effect a differential force on said piston means when the pressure is substantially equalized on said first and second reaction surface means to aid in displacing said piston means to a position to close the bore to restore compression in the cylinder of the internal combustion engine.

24. The automatic decompression valve of claim 23 wherein said valve means comprises a spring biased ball seated against a mouth of said orifice.

25. The automatic decompression valve of claim 23 wherein an adjusting means is operatively connected to said housing for adjusting a limit of travel of said piston means in said housing to vary the time with respect to the operation of the internal combustion engine when said valve will restore normal compression to the cylinder of the internal combustion engine.

26. The automatic decompression valve of claim 25 wherein said adjusting means comprises a screw cap threaded into an end of said housing.

27. The automatic decompression valve of claim 26 including a shim-seal which is placed between a portion of said screw cap and said housing to effect a fluid-tight seal between said screw cap and said housing and to prevent said screw cap from penetrating said housing beyond a predetermined distance.

* * * * *